United States Patent
Rudy

(10) Patent No.: US 9,039,566 B2
(45) Date of Patent: May 26, 2015

(54) PLANETARY ROLLER GEAR DRIVE

(71) Applicant: Schaeffler Technologies AG & Co. KG, Herzogenaurach (DE)

(72) Inventor: Dietmar Rudy, Kleinbundenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 139 days.

(21) Appl. No.: 13/690,342

(22) Filed: Nov. 30, 2012

(65) Prior Publication Data

US 2013/0143711 A1 Jun. 6, 2013

(30) Foreign Application Priority Data

Dec. 5, 2011 (DE) .......................... 10 2011 087 712

(51) Int. Cl.
*F16H 1/28* (2006.01)
*F16H 25/22* (2006.01)

(52) U.S. Cl.
CPC .............. *F16H 1/28* (2013.01); *F16H 25/2266* (2013.01); *F16H 2025/2276* (2013.01); *F16H 25/2252* (2013.01)

(58) Field of Classification Search
CPC ............ F16H 25/2252; F16H 25/2266; F16H 2025/2276; F16H 1/28

USPC .......... 74/89.23, 89.3, 89.31, 424.71, 424.72, 74/424.95, 424.88, 424.89, 424.91, 74/424.92, 841, 127, 499, 509; 475/331; 384/572, 550, 565

See application file for complete search history.

(56) References Cited

U.S. PATENT DOCUMENTS

| 2,951,390 A * | 9/1960 | Martens et al. ............ 74/424.92 |
| 2005/0160856 A1 | 7/2005 | Sugitani |

FOREIGN PATENT DOCUMENTS

| DE | 102009040606 | 3/2011 |
| EP | 0168942 | 1/1986 |
| EP | 1961995 | 8/2008 |

* cited by examiner

*Primary Examiner* — Edwin A Young
*Assistant Examiner* — Colby M Hansen
(74) *Attorney, Agent, or Firm* — Volpe and Koenig, P.C.

(57) ABSTRACT

A planetary roller gear drive with a spindle nut (1) that is arranged on a threaded spindle (2) and with planets (3) that are arranged distributed around the periphery and are in rolling engagement with the spindle nut (1) and the threaded spindle (2). The planets (3) revolve on planetary orbits (P) that are arranged perpendicular to the spindle axis and the planets (3) are each divided into multiple planet parts arranged one behind the other in the axial direction.

10 Claims, 1 Drawing Sheet

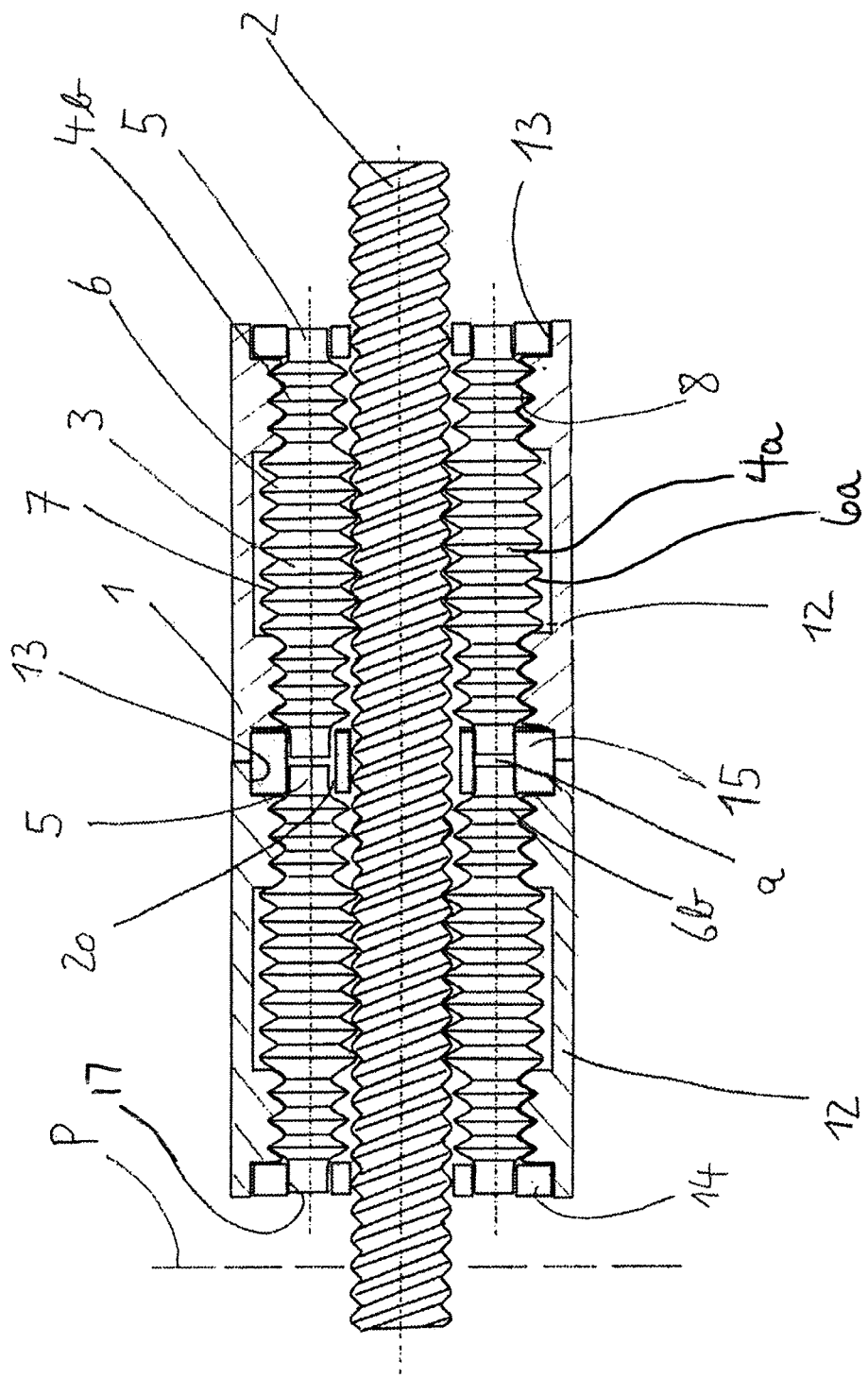

PLANETARY ROLLER GEAR DRIVE

INCORPORATION BY REFERENCE

The following documents are incorporated herein by reference as if fully set forth: German Patent Application No. 102011087712.6, filed Dec. 5, 2011.

BACKGROUND

The present invention relates to a planetary roller gear drive that converts a relative rotation between a spindle nut and a threaded spindle into a relative translational displacement between the spindle nut and threaded spindle.

From DE 102009040606 A1, a planetary roller gear drive is known that is provided with a plurality of planets that are arranged distributed around the periphery and are in rolling engagement with the threaded spindle and the spindle nut, wherein the threaded spindle has a plurality of helical-shaped windings wound around the spindle axis of at least one thread groove. The spindle nut is provided with a nut-side profile on its inner periphery, wherein the planet-side profile of the planets is in rolling engagement with the nut-side profile. The planet-side profile is formed by annular, closed grooves that are arranged perpendicular to the planet axis. The planets revolve on planetary orbits that are arranged perpendicular to the spindle axis.

For planetary roller gear drives, the transmission ratio between the spindle nut and the threaded spindle is defined by the pitch of the thread groove on the threaded spindle, also by the rolling circle diameter of the threaded spindle and the spindle nut, and also by the rolling circle diameter of the planet, wherein often stepped planets with two different rolling diameters are used, a larger rolling diameter for the rolling engagement with the threaded spindle and a smaller rolling diameter for the rolling engagement with the spindle nut. In the case of stepped planets, with respect to the length of the planets, approximately one half the length of the planet is in rolling engagement with the spindle nut and the other half of the length is in rolling engagement with the threaded spindle.

If planetary roller gear drives with high load ratings and large spindle diameters are used, load-bearing lengths on the threaded spindle and on the spindle nut of, for example, 100 mm to 150 mm could be required, so that, in the case of stepped planets, lengths of up to 300 mm are needed. Such planetary roller gear drives are expensive to produce.

SUMMARY

The objective of the invention is to provide a planetary roller gear drive that is suitable for high load ratings and can be produced in a cost-effective way.

This objective is met by the planetary roller gear drive having one or more features of the invention. Because the planets are each divided into multiple parts that are arranged one behind the other in the axial direction, significant cost advantages are produced in production especially for planetary roller gear drives with large load ratings. The required load-bearing lengths can be provided by multiple parts that are arranged one behind the other in the axial direction.

The longer the structures of the planets are, the more grooves the planets must have and the more precise the pitch of the grooves must be, in order to guarantee the rolling engagement with the spindle nut and with the threaded spindle without any problems. The more precise the pitch is, the greater the production complexity must be in order to produce the planets. Through the division of the planets according to the invention into portions, the requirements on the pitch precision of the grooves formed on the planets can be significantly reduced. Pitch inaccuracies are not significant over the short lengths of the portions of the planet. The planetary roller gear drive according to the invention allows production technologies with which the planets can be provided with the planet-side profiles without cutting in a shaping process. In this way, the planets can be produced in a cost-effective manner. Planetary roller gear drives according to the invention can be provided for high load ratings, wherein the ratio of diameter to length of the planets can be less than 0.1. Thus, in comparison with the diameter, very thin planets can be provided.

Advantageously, an axial distance is provided between planets that are arranged adjacent to each other in the axial direction, so that pitch inaccuracies are equalized such that the distance between the free ends acts as a buffer space that can receive the planets without contacting the planets adjacent in the axial direction.

For stepped planets, each planet is provided with a larger rolling diameter for the rolling engagement with the threaded spindle and with a smaller rolling diameter for the rolling engagement with the spindle nut. In this way, the planets can be arranged coaxially in a simple manner.

Each planet can be formed from two or more planet portions that are arranged coaxial to each other.

In a known way, the planets can be supported in spacer rings that hold the planets arranged distributed around the periphery. These spacer rings revolve together with the planets. The spacer rings have bearing seats for a planet, wherein the bearing seats define the distribution of the planets around the periphery. The spacer rings are arranged so that they can rotate in the spindle nut.

Spacer rings can be arranged on each of the two axial ends of the planets. In the planetary roller gear drive according to the invention, the two axial outer planet portions of the planet are each supported on the outer ends with a spacer ring.

In order to guarantee that the planets remain coaxial during revolution around the planetary orbits, it is advantageous to provide a synchronizing ring that can rotate in the spindle nut between two adjacent planets. This synchronizing ring has bearings seats for the two adjacent planets. In this way, a common synchronizing ring for two adjacent planets is provided.

Advantageously, a common bearing seat for the two adjacent planets can be provided. The bearing seats can be arranged in a star shape about the spindle axis and can have an approximately u-shaped construction and can be open toward the outside in the radial direction. The bearing seats can also be formed by holes or bores that are formed in a disk used as the synchronizing ring. The planets divide the bearing seat. Synchronizing rings according to the invention can transmit forces that are introduced via the planets. The bearing seats of the synchronizing rings have a correspondingly stable construction, in order to guarantee a trouble-free synchronization. Such synchronizing rings can be thicker than the spacer rings.

If the planet is formed from two planets, in total, two spacer rings and one synchronizing ring can be provided: one spacer ring on each axial end of the planet and one synchronizing ring between the two planets. If more planets are desired, additional synchronizing rings can be provided in the described way between the respective planets.

Pins on the ends of the planets face each other and can be supported in the same bearing seat, wherein the bearing seat has an axial extension that is greater than the sum of the axial insertion depths of the two pins into the bearing seat. In this way it is guaranteed that a distance is set between the pin ends so that tolerance inaccuracies of the planets can be equalized. The pins can simultaneously form a sliding surface in a known manner in the bearing seat with its lateral surface. This sliding surface forms, with a sliding surface of the synchronizing ring, a sliding bearing, so that a low-friction rotation of the planets in their bearing seats is guaranteed.

The spindle nut can be formed by multiple nut parts that are arranged one behind the other in the axial direction. These nut parts can be connected rigidly to each other, wherein material fit, friction fit, positive fit, and also adhesive connections are conceivable. The connection can be provided directly between the nut parts. It is conceivable, however, to house the nut parts in a common housing, wherein the rigid connection can be produced by the housing in this case.

Nut parts that are arranged adjacent to each other can be provided on their facing end sides with a receptacle for the common synchronizing ring. After insertion of the synchronizing ring, the two nut parts can be joined. In this way, a middle synchronizing ring can be easily installed in the spindle nut. The two receptacles together can form a sliding bearing seat for the common synchronizing ring.

The synchronizing rings can be guided in the radial direction on their outer periphery in the spindle nut and can be provided on their outer periphery with a sliding surface. The radial guidance provided for a trouble-free, coaxial arrangement of the synchronizing ring relative to the spindle axis, and thus for a trouble-free guidance of the planets.

Spacer rings can be formed from plastic. A common synchronizing ring provided for two planets can be made from bronze. Such synchronizing rings guarantee, on one side, a stable arrangement of the planets and thus a trouble-free, synchronous revolution of the planets. On the other hand, they form a good sliding material in order to form sliding bearing surfaces both on the outer periphery and also in the bearing seats for the planets. Synchronizing rings are more strongly loaded than simple spacer rings.

BRIEF DESCRIPTION OF THE DRAWINGS

The invention will be explained in more detail below with reference to an embodiment shown in the single FIGURE.

The single FIGURE shows a planetary roller gear drive according to the invention in a longitudinal section.

DETAILED DESCRIPTION OF THE PREFERRED EMBODIMENTS

Referring to the FIGURE, a spindle nut 1 is arranged on a threaded spindle 2. The spindle nut 1 or the threaded spindle 2 can be driven by a not-shown motive drive and set into rotation.

A plurality of planets 3 arranged distributed around the periphery of the threaded spindle 2 are in rolling engagement with the threaded spindle 2 and the spindle nut 1. The planets 3 revolve about the spindle axis of the threaded spindle 2 on planetary orbits P arranged perpendicular to the spindle axis. They rotate about their planetary axis and rotate relative to the threaded spindle 2 and the spindle nut 1, wherein the planets 3 roll on the inner periphery of the spindle nut 1 and on the outer periphery of the threaded spindle 2.

The planets 3 are arranged coaxially and one behind the other in the axial direction. The planets 3 have identical constructions. The planet 3 has a radially enlarged middle section 4a and two radially tapered end sections 4b. The planet 3 is provided with a pin 5 on each of its axial ends.

In a known way, the planets 3 are provided with a planet-side profile 6 that meshes with the threaded spindle 2 and the spindle nut 1. The planet-side profile 6 has a middle profile section 6a that is formed on the outer periphery of the middle section 4a. The profile section 6a meshes with the threaded spindle 2. The two end sections 4b are each provided on their outer periphery with an outer profile section 6b that meshes with the spindle nut 1. The profile sections 6a, 6b are formed by annular, closed, parallel grooves 7 that are arranged parallel to the planetary orbit P.

The spindle nut 1 is provided on its inner periphery at both axial ends with a nut-side profile 8 that meshes with the planet-side outer profile sections 6b. The nut-side profile 8 is formed by annular, closed, parallel grooves that are arranged parallel to the planetary orbit P.

The threaded spindle 2 is provided on its outer periphery with a threaded groove that is formed from a plurality of windings wound in a helical shape around the spindle axis.

The spindle nut 1 is combined from two nut parts 12 that are arranged so that they cannot move relative to each other. Both nut parts 12 are each provided with the nut-side profile 8. The nut parts 12 have identical structures. The nut part 12 is provided on both axial ends with an annular recess 13 that is formed by a peripheral, radial offset.

The planets 3 are supported in known spacer rings 14 and a synchronizing ring 15 according to the invention and distributed uniformly across the periphery of the threaded spindle 2. The planets 3 are supported so that they can rotate with their pins 5 formed on the ends facing away from each other in holes of the spacer rings 14. The spacer rings 14 are formed from a sliding bearing material and are formed by disks with end faces that are provided with axial passage holes arranged distributed around the periphery. These holes form bearing seats 17 for the planets 3. The spacer rings 14 are arranged in the annular recesses 13 of the nut parts 12, wherein the recesses 13 form sliding bearing seats for the spacer rings 14. The spacer rings 14 are guided in the radial and axial directions in the sliding bearing seats.

The synchronizing ring 15 is inserted into the two annular recesses 13 of the two nut parts 12. The two recesses 13 together form a sliding bearing seat for the synchronizing ring 15, wherein the synchronizing ring 15 is supported in a guided manner in the axial and radial directions in the sliding bearing seat and so that it can rotate. The synchronizing ring 15 is formed from a disk and is provided on its two end sides with passage holes 20 that are arranged distributed around the periphery and form the common bearing seats for the planet parts 4. The planets 3 engage with their facing pins 5 in the common passage hole 20 and divide the common bearing seat. Each of the planets 3 are supported so that they can rotate in the bearing seats 17 of the spacer ring 14 and the synchronizing ring 15.

From the FIGURE it is clear that the common bearing seat of the synchronizing ring 15 has an axial extension that is larger than the sum of the axial insertion depths of the two pins 5 into the common bearing seat. In this way it is guaranteed that a distance (a) is set between the pin ends of the two pins 5, so that tolerance inaccuracies of the planets 3 can be equalized. Planets 3 can therefore "breathe" in the synchronizing ring 15. It is preferable when some distance is provided between the beginning of the outer planet-side profile section 6b and the synchronizing ring 15, so that no axial forces are transmitted between the planet 3 and the synchronizing ring 15.

The intermediate space formed by the distance a between the planets 3 in the synchronizing ring 15 can be filled with a lubricant.

With their lateral surfaces, the pins 5 simultaneously form sliding surfaces that form sliding bearings with the sliding surfaces of the spacer ring 14 and the synchronizing ring 15, wherein these sliding surfaces are formed by the walls of the holes and the passage holes 20, so that a low-friction rotation of the planets 3 in their bearing seats 17 is guaranteed.

The spindle nut can alternatively be constructed in one piece; in this case, the middle synchronizing ring can be divided with a dividing plane lying in the spindle axis. Planets can be provided that have more than two planet portions that are, however, arranged in the described way relative to each other and are supported in synchronizing rings.

LIST OF REFERENCE NUMBERS

1 Spindle nut
2 Threaded spindle
3 Planet
4a Middle section
4b End section
5 Pin
6 Planet-side profile
6a Profile section
6b Profile section
7 Groove
8 Nut-side profile
12 Nut part
13 Annular recess
14 Spacer ring
15 Synchronizing ring
17 Bearing seat
20 Passage hole

The invention claimed is:

1. A planetary roller gear drive comprising a spindle nut that is arranged on a threaded spindle, planets are arranged distributed around a periphery of the threaded spindle and are in rolling engagement with the spindle nut and the threaded spindle, the planets revolve on planetary orbits that are perpendicular to a spindle axis, the planets are arranged one behind another in an axial direction, the planets each include a first profile that engages the threaded spindle and a second profile that engages the spindle nut, axially adjacent ends of the planets are supported in a common synchronizing ring, and the common synchronizing ring is arranged within the spindle nut and can rotate in the spindle nut.

2. The planetary roller gear drive according to claim 1, wherein an axial distance (a) is provided between the planets.

3. The planetary roller gear drive according to claim 1, wherein spacer rings are arranged to rotate in the spindle nut and the spacer rings include a common bearing seat for the planets.

4. The planetary roller gear drive according to claim 3, wherein one of the spacer rings is arranged on each of two axial sides of the planets, and the two axial outer sides of the planets are each supported in one of the spacer rings.

5. The planetary roller gear drive according to claim 1, wherein ends of each planet include pins, each of the pins are supported in a common bearing seat of the common synchronizing ring, and the common bearing seat has an axial extension that is greater than a total of an axial insertion depth of the two pins into the common bearing seat.

6. The planetary roller gear drive according to claim 1, wherein the spindle nut is formed by a plurality of nut parts that are arranged one behind another in the axial direction.

7. The planetary roller gear drive according to claim 1, wherein the spindle nut is formed by a plurality of nut parts that are arranged one behind another in the axial direction, and the nut parts are each provided with a receptacle for the common synchronizing ring.

8. The planetary roller gear drive according to claim 7, wherein two receptacles together form a sliding bearing seat for the common synchronizing ring.

9. The planetary roller gear drive according to claim 1, wherein the common synchronizing ring is formed from a sliding bearing material.

10. The planetary roller gear drive according to claim 9, wherein the sliding bearing material is bronze.

* * * * *